Nov. 6, 1956
J. H. HAYES
2,769,510
OVERRUNNING CLUTCH AND ONE WAY BRAKE WITH DISABLER FOR FISHING REEL
Original Filed May 1, 1946
2 Sheets-Sheet 1
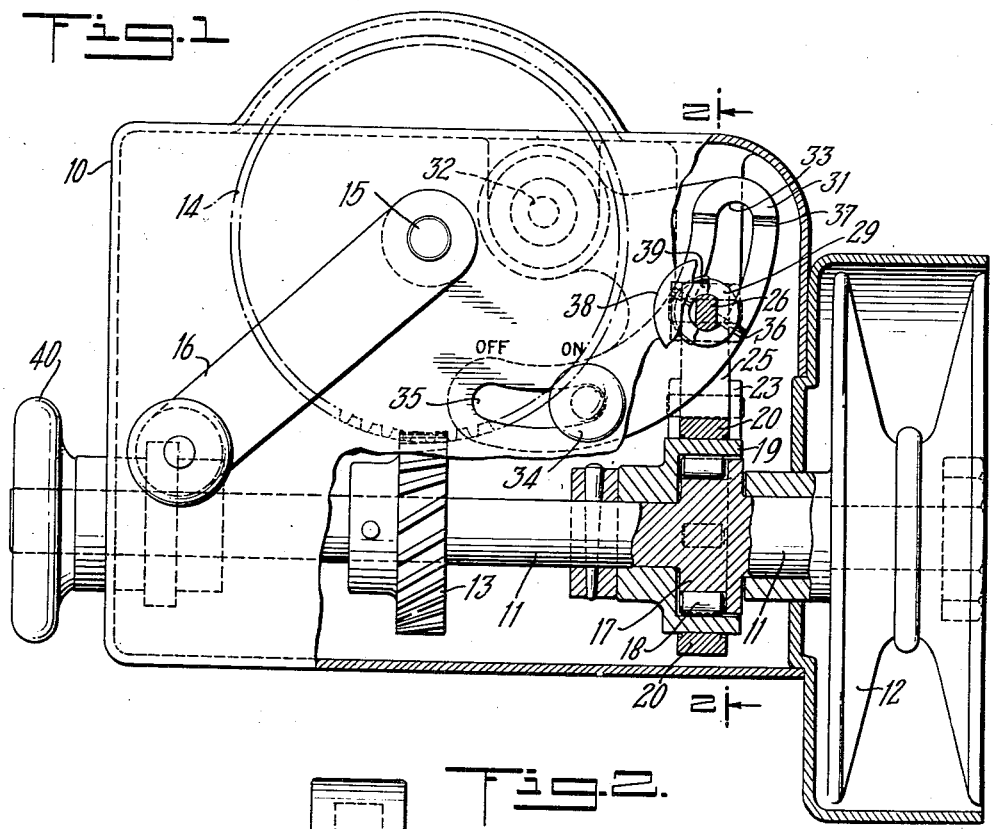
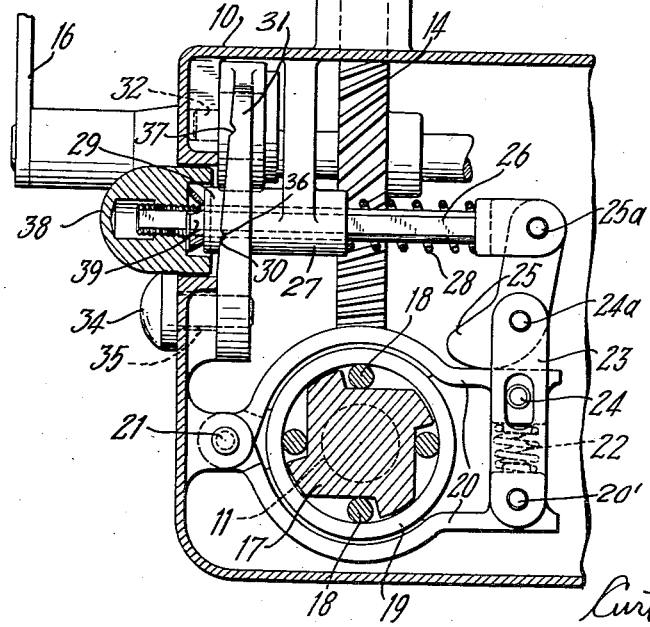
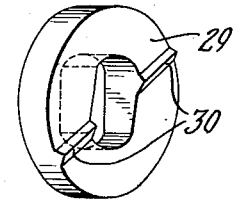
INVENTOR
JAMES H. HAYES
BY
Curtis, Morris & Safford
ATTORNEYS Nov. 6, 1956
J. H. HAYES
2,769,510
OVERRUNNING CLUTCH AND ONE WAY BRAKE WITH
DISABLER FOR FISHING REEL
Original Filed May 1, 1946
2 Sheets-Sheet 2
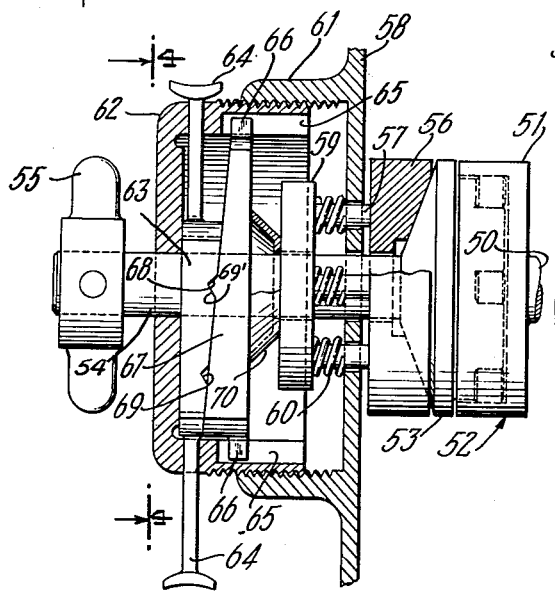
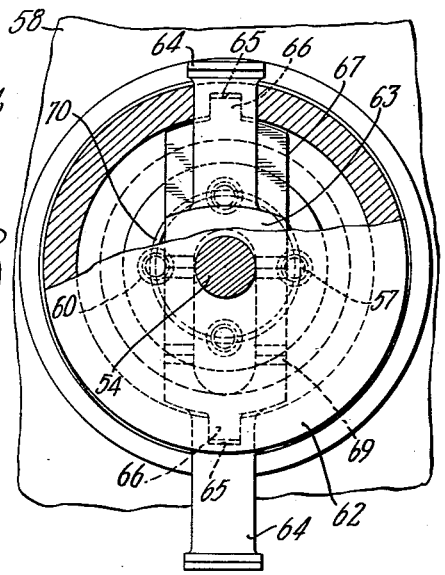
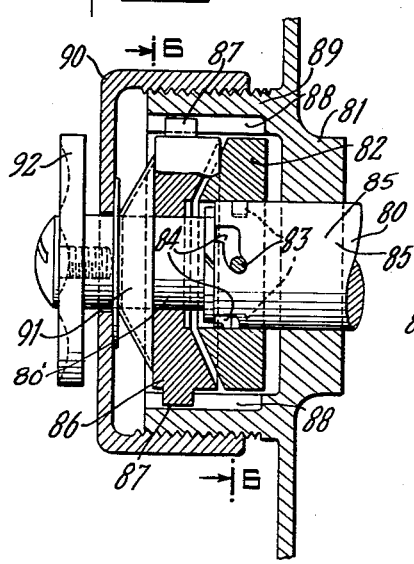
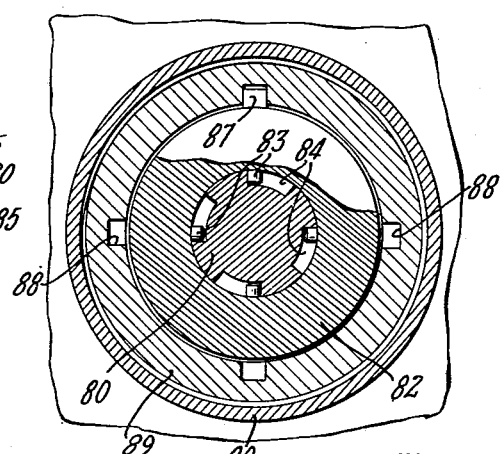
INVENTOR
JAMES H. HAYES
BY
Curtis, Morris + Safford
ATTORNEYS

United States Patent Office 2,769,510
Patented Nov. 6, 1956

2,769,510

OVERRUNNING CLUTCH AND ONE WAY BRAKE WITH DISABLER FOR FISHING REEL

James H. Hayes, Yonkers, N. Y.

Original application May 1, 1946, Serial No. 666,396, now Patent No. 2,604,273, dated July 25, 1952. Divided and this application April 23, 1952, Serial No. 283,959

8 Claims. (Cl. 188—82.3)

This application is a division of my copending application Serial No. 666,396, filed May 1, 1946, now Patent No. 2,604,273.

This invention relates to fishing reels and more particularly to the brake mechanism thereof.

The principal object of the invention is to provide an improved brake mechanism which may be rapidly brought into action with a preadjusted tension. In operation, the brake mechanism is applied or brought into action manually and, by adjustable devices, the tension thereof is set with consideration for the tensile strength of the fishing line employed, so that the spool will rotatably yield to a pull on the line below such value as would cause the line to break. After such tension has been established, the simple movement of an interposer will free the brake to enable casting or free spooling. To re-apply the brake it is simply necessary to shift the interposer back, and in doing so the brake will become applied with the previously set tension. By this means each brake application is effected in a simple, and rapid manner and uniformity of tension is obtained within safe limits to insure the obviating of the danger of overtensioning the line.

As a modified form of the invention there is provided a drag applying mechanism which automatically comes into action when the spool shaft is rotated in dragging direction.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is an elevation of a reel housing and spool showing the manner in which the brake mechanism is applied thereto.

Fig. 2 is a section taken substantially along lines 2—2 of Fig. 1.

Fig. 2a is a detail of a camming collar.

Fig. 3 is a view showing a modified form of brake employing the same principles as that of Figs. 1 and 2.

Fig. 4 is a section taken on lines 4—4 of Fig. 3 with part of the housing broken away.

Fig. 5 is a further modification in which the preadjusted tension is applied in a somewhat different manner.

Fig. 6 is a section taken substantially on lines 6—6 of Fig. 5.

Referring to Fig. 1, there is shown a type of reel comprising a housing 10 in which there is supported a spool shaft 11 provided with a spool 12 affixed to one end thereof. The shaft and spool are driven through gears 13 and 14, the latter of which is supported on a rod 15 to which handle 16 is secured.

In accordance with the present invention the spool shaft 11 has integral therewith a clutch element 17 notched as shown in Fig. 2 to receive rollers 18. Surrounding the element 17 and rollers 18 is a drum 19 which is freely rotatable on shaft 11 and at opposite sides of the shell are brake shoes 20, pivoted on a fixed pin 21 and normally urged apart and out of contacting engagement with drum 19 by a spring 22.

The lower shoe 20 has a link 23 pivoted thereto at 20' and a pin 24 on the upper shoe passes through an opening in the link 23 the upper end of which link 23 is pivoted at 24a to a cam 25 which in turn is pivoted at its upper end at 25a to a rod 26. The rod is mounted for reciprocation in a fixed bearing 27 carried by the housing 10 and is constrained against rotation. A spring 28 serves to normally rock cam 25 clockwise into its brake releasing position as shown in Figure 2.

A sleeve or collar 29 (Fig. 2a) is slidable on rod 26 but constrained against rotation thereon and this sleeve is provided with a pair of radial detenting wedges 30. At the right of sleeve 29 (as viewed in Figure 2) is a tapered member 31 pivoted on a stud 32 (Fig. 1) so that it may be rocked clockwise from the position shown in Fig. 1 through an angle determined by slot 33 through which rod 26 extends.

A knob 34, secured to member 31 extends through an arcuate opening 35 in the housing 10 and by means of this knob the member 31 may be rocked between its extreme positions. The member 31 has a pair of notches 36 and 37, one of which registers with wedges 30 of sleeve 29 when the member 31 is in one of its extreme positions as shown in Fig. 1 and the other of which registers with wedge 30 when the member 31 is in the other of its extreme positions.

The left end of rod 26 as viewed in Figure 2 has threaded thereon a tension adjusting knob 38 whose inner end bears against a cupped spring washer 39 which abuts sleeve 29. By adjusting this knob the pressure between the sleeve 29 and member 31 may be varied in accordance with the desired conditions.

When the knob 34 is moved to the position of Fig. 1 it carries with it the member 31, so that the latter now cams sleeve 29 toward the left (as viewed in Fig. 2). Sleeve 29 in turn, bears against spring 39 and therethrough moves knob 38 and rod 26 to the left to rock cam 25 and urge the brake shoes 20 toward drum 19, to effect a braking action. Therefore when tension on the fishing line turns shaft 11 counterclockwise (as viewed in Figure 2), element 17 will turn therewith and through rollers 18 lock with drum 19. The drum, being engaged by the brake shoes, will slip in accordance with the initially set tension applied by knob 38 to spring 39.

Thus, when a strike is made the fisherman may immediately throw the brake into action with a predetermined and preset tension without danger of overstraining the line by a too hasty overtensioning.

When knob 34 is in the other of its extreme positions, member 31 will be in position with its narrower end and notch 37 opposite sleeve 29 so that spring 28 may urge rod 26 to the right to release the brake. This position of the parts may be termed the off or non-braking position wherein the shaft 11 and spool 12 are freely rotatable in a clockwise direction (as viewed in Fig. 2) for reeling-in action or free spooling. A thumb drag 40 (Fig. 1) is secured to shaft 11 to enable control of the free spooling action.

In the modification of Fig. 3, shaft 50 represents the spool shaft to which drum 51 of an overrunning clutch 52 is secured and through which a conical braking element 53 is driven when there is a drag on the line. This element has integral therewith, a rod 54 provided with a thumb drag 55. Facing element 53 is a complemental braking element 56 free on rod 54 and supported by four posts 57 in housing 58. These posts are also secured in a plate 59 and through springs 60 the plate and brake element 56 are biased toward the left as viewed in Fig. 3, out of braking position.

Housing 58 has a circular, internally threaded boss 61 into which is threaded a head 62. A yoke 63 straddles rod 54 and has extending finger pieces 64 through which the yoke may be shifted transversely to the axis of rod 54. The head 62 is provided with a pair of channels 65 into which lugs 66 of a second yoke 67 fit. This yoke has a detenting wedge 68 facing yoke 63 and adapted to cooperate with two notches 69 and 69' therein. Between yoke 67 and plate 59 is a cupped spring 70 urging the yoke 67 and plate 59 apart.

The action is such that when yoke 63 is in its lower position as shown in Fig. 3, its camming surface slides yoke 67 to the right, pressing spring washer 70 against plate 59 to urge clutch element 56 into braking engagement with braking element 53 to place the drag on spool shaft 50 through the overrunning clutch 52. The force of the braking action will depend on the setting of head 62, which by threading into and out of boss 61 will preset the tension applied through spring 70 by decreasing or increasing the distance between the yoke 67 and plate 59.

When yoke 63 is shifted to its upper position, yoke 67 is free to shift to the left under action of springs 70 and 60 to release the brake. Thus, when a strike is made the brake may be quickly applied by simply shifting yoke 63 to the position shown in Figure 3.

A further modification is shown in Figs. 5 and 6 wherein 80 constitutes a spool shaft supported in housing 81 and having a braking element 82 at one end thereof supported by four circumferentially spaced pins 83 extending into cam slots 84 in the shaft. The action is such that when shaft 80 is turned relatively to element 82, in the direction of arrow 85, slots 84 will shift pins 83 and element 82 to the left against braking element 86 to effect braking of the shaft. When it is turned in the opposite direction, for reeling, the slots cam the pins and element 82 out of braking engagement.

The braking element 86 is freely mounted on a reduced part 80' of shaft 80 and has lugs 87 riding in channels 88 of housing 89. Threaded on the housing is a head 90 which may be adjusted axially to tension a cupped spring 91 between the head 90 and braking element 86. The action in this modification is automatic in that when there is a drag on the line, turning shaft 80 in the direction of arrow 85, element 82 shifts to the left (as viewed in Figure 5) and engages element 86 with a force predetermined by the initial adjustment of head 90. The extremity of shaft 80 may be provided with the usual thumb drag 92.

It is, of course, to be understood from the description of the form of the invention illustrated in Figures 1 and 2, that the spool shaft in the form of the invention herein claimed, may be driven by any suitable mechanism properly interconnected with the spool shaft.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What I claim is:

1. For use with a fishing reel comprising a housing, a spool shaft rotatably supported on said housing, an overrunning clutch including a drum member secured to said shaft and an interacting clutch element engageable with the inner surface of said drum member, a rod mounted in said housing, a first braking element rigid with said rod and with said clutch element, a second braking element supported by said housing for movement toward and away from said first braking element and nonrotatable in respect thereto, a plate longitudinally movable on said rod and nonrotatable in respect to said second braking element, springs interposed between said plate and said housing normally urging said second braking element away from said first braking element, a spring member interposed between said plate and a wall of said housing to move said second braking element into engagement with said first braking element against the action of said first mentioned springs.

2. The combination of elements recited in claim 1 wherein means is provided within said housing for rendering said spring members selectively operative and inoperative.

3. The combination of elements recited in claim 2 wherein said last mentioned means includes a pair of relatively movable cooperating wedge members between said plate and an adjacent wall of said housing.

4. The combination of elements recited in claim 3 wherein means is provided within said housing for varying the tension on said spring member through said wedge members.

5. The combination of elements recited in claim 4 wherein said last mentioned means comprises an adjustable head on said housing to move said wedge members as a unit selectively toward and away from said plate.

6. The combination of elements recited in claim 5 wherein manually operable means is provided for moving said wedge members into and out of cooperative relation with said spring member.

7. For use with a fishing reel comprising a housing, a spool shaft carried by said housing, a rod mounted in said housing, a clutch interposed between said spool shaft and said rod, a first braking element rigid with one member of said clutch, a second braking element movable into and out of engagement with said first braking element, a pair of wedges mounted within said casing, one of said wedges being movable transversely of said rod to move the other of said wedges longitudinally of said rod and a spring member interposed between said last mentioned wedge and said braking element to force said second braking element into engagement with said first braking element when said movable wedge is in one of its positions.

8. The combination of elements recited in claim 7 wherein means is provided for adjusting the tension of said spring member to vary the degree of friction between said braking elements.

References Cited in the file of this patent

UNITED STATES PATENTS

| | | |
|---|---|---|
| 1,257,576 | Boehck | Feb. 26, 1918 |
| 1,385,457 | Kiest | July 26, 1921 |
| 1,547,238 | Russell et al. | July 28, 1925 |
| 1,673,382 | Vom Hofe | June 12, 1928 |
| 1,992,912 | De La Mater | Feb. 26, 1935 |
| 2,408,179 | Schuetz et al. | Sept. 24, 1946 |